(12) United States Patent
Brynielsson

(10) Patent No.: US 6,947,727 B1
(45) Date of Patent: Sep. 20, 2005

(54) METHOD AND SYSTEM FOR AUTHENTICATION OF A SERVICE REQUEST

(75) Inventor: Thore Brynielsson, Kullavik (SE)

(73) Assignee: AB Tryggit, Kullavik (SE)

( * ) Notice: Subject to any disclaimer, the term of this patent is extended or adjusted under 35 U.S.C. 154(b) by 302 days.

(21) Appl. No.: 10/089,548

(22) PCT Filed: Sep. 22, 2000

(86) PCT No.: PCT/SE00/01842

§ 371 (c)(1),
(2), (4) Date: Aug. 8, 2002

(87) PCT Pub. No.: WO01/26061

PCT Pub. Date: Apr. 12, 2001

(30) Foreign Application Priority Data

Oct. 1, 1999 (SE) .................................... 9903575

(51) Int. Cl.[7] .............................................. H04M 1/66
(52) U.S. Cl. ................ 455/411; 455/412.1; 455/414.1; 455/419
(58) Field of Search ........................ 455/411, 403, 407, 455/410, 412.1–412.2, 415, 418, 419, 420, 455/558, 560, 414.1

(56) References Cited

U.S. PATENT DOCUMENTS

| | | | |
|---|---|---|---|
| 4,726,058 A | * | 2/1988 | Skelly ........................ 379/163 |
| 5,416,306 A | | 5/1995 | Imahata |
| 5,471,650 A | * | 11/1995 | Vexler et al. ................. 455/69 |
| 5,708,422 A | | 1/1998 | Blonder et al. |
| 5,842,124 A | * | 11/1998 | Kenagy et al. ............. 455/418 |
| 5,864,757 A | * | 1/1999 | Parker ........................ 455/418 |
| 5,878,337 A | | 3/1999 | Joao et al. |
| 5,956,636 A | * | 9/1999 | Lipsit ......................... 455/411 |
| 6,085,081 A | * | 7/2000 | Leskinen .................... 455/406 |
| 6,124,799 A | * | 9/2000 | Parker ........................ 340/5.85 |
| 6,161,012 A | * | 12/2000 | Fenton et al. ............. 455/432.2 |
| 6,352,639 B2 | * | 3/2002 | Ito et al. ..................... 208/113 |

FOREIGN PATENT DOCUMENTS

WO    WO 99/45693    9/1999

* cited by examiner

Primary Examiner—CongVan Tran
(74) Attorney, Agent, or Firm—Harness, Dickey & Pierce, P.L.C.

(57) ABSTRACT

A method and a system is directed to authentication of a commission from a customer to a service provider. A set of randomly generated code words are stored in a memory circuit associated with a mobile-telephone subscription in a mobile telephone, as well as in a database together with an association to the mobile-telephone subscription. The method includes the steps of determining the identify of the customer, of identifying the mobile-telephone subscription on the basis of the identity of the customer, of retrieving a code word from the memory circuit, and of checking the presence of the code word in the code word set in the database that is associated with the mobile-telephone subscription, in order to thus authenticate the commission.

20 Claims, 6 Drawing Sheets

Code words in SIM and in database before start of current commission:

US 6,947,727 B1

METHOD AND SYSTEM FOR AUTHENTICATION OF A SERVICE REQUEST

This application is the national phase under 35 U.S.C. § 371 of PCT International Application No. PCT/SE00/01842 which has an International filing date of Sep. 22, 2000, which designated the United States of America, the entire contents of which are hereby incorporated by reference.

TECHNICAL FIELD

The present invention concerns a method and a system for authentication of a request from a customer to a service provider.

TECHNICAL BACKGROUND

A constantly recurring problem on the market in the case of purchases for which credit cards or bankcards are used is to establish the identity of the card user. Usually, each card has a specific code, for instance a four-digit number code, which in some stores may be inputted in a terminal in conjunction with the purchase. However, this is not a particularly attractive solution for an individual possessing a dozen cards, each having its specific code. Restaurants, for example, often employ the method of requesting the customer to sign a slip in confirmation of the transaction, and the signature serves as a post-check, should any doubt arise about the payment. This means that only long after the event will the cardholder notice if an unauthorized individual has utilized his card without his knowing. It might even happen that the personnel of the restaurant fraudulently charge the card with several transactions during the period when they alone have access to the card. It is often sufficient that a dishonest person gets hold of the number of the card to enable him to use the card on a later occasion.

According to prior-art technology intended for situations wherein a customer has recurrent contacts with e.g. a bank, the customer is equipped with a list of codes hidden by a rub-off film. The bank has access to the same list, which may be stored e.g. in the bank computer system. Each time the customer requests a transaction, for instance by telephone, he exposes one of the code number by rubbing off the film and then discloses the exposed number to the bank. The number is compared against the list in the bank, and a match ensures that the customer is the person he claims to be, or at least is in possession of the rub-off list in question.

According to prior-art systems devised to provide secure transactions for instance on the Internet, the user must have access to a small electronic device at the time of the transaction. Codes are exchanged between the computer and the electronic device in order to ensure that the user actually has access to the electronic device. This technology is employed above all in conjunction with banking services on the Internet when a customer uses the service comparatively often.

The solution involving the individual-related electronic device does, however produce two problems:

In the first place, it is possible for a skilful expert to copy the electronics, for example the ROM memory, of an electronic device to which he has access albeit briefly. The electronic device may then be returned to the owner who suspects no mischief. From then on, there is no possibility for the computer system to ascertain whether a request is made by the owner or the dishonest person.

In the second place, an electronic device is specific to each service provider, which means that a user of several services must carry with him several electronic devices. Consequently, there is a risk that he has forgotten the electronic device that is required for the occasion. In addition, it reduces the user's chances to keep an eye on all electronic devices, and a dishonest person can easily use a stolen device or copy a "borrowed" device before the user has had time to miss it.

When credit cards are used for payment over the Internet, generally only the number of the credit card serves as the authenticity check. It is possible to encrypt the credit card number, but if the encrypting code is cracked, a dishonest person could use the card comparatively freely until the time when the user receives a bill, usually at the end of a month. Electronic devices of the kind described above could of course be used to increase security, but the problems related to copying of the electronics of the device and the need for several devices do, of course remain.

Some providers of services offer systems on the Internet, according to which a person must first register as a customer and only then is he allowed to make purchases using his credit card. Like the system involving the electronic devices, these systems suffer from the disadvantage that they are specific to each service provider, making the user's life very complicated as he has to have contact with several service providers.

Other common services for which authentication of a user's authorization is needed are for logging in into computer systems and admittance into security-classified premises. These systems are based almost exclusively on the presentation of a user ID in conjunction with a code or a password, which in some systems are changed according to predetermined routines, or on security pass cards and an associated code. Generally speaking, the fact is that in our society a multitude of codes exists which it is difficult for the individual to remember. He might therefore be tempted to write down the codes somewhere, which reduces security.

The combination of disclosure of a code and an electronic device, which has to be physically available, improves security but at the cost of requiring several devices. Consequently, this technology hardly presents a universal solution to the problems outlined above.

There is therefore a need for a uniform system that might be used with several types of service requests and that allows the authenticity of the customer or user to be verified in a simple manner.

Definitions

In the following description, a number of expressions will occur, which are defined as follows.

By the expression "commission" is to be understood generally a service that a person wishes to be rendered by a provider. For example, a commission could be a financial transaction delivered by a bank or similar establishment, but a commission could equally well be a request for admission into a building or for log-in into a computer system. To order such a commission is referred to as a "service request".

By the expression "service provider" is to be understood both the company carrying out the commission (such as a bank, a credit card company or a security company) and the equipment used to implement the commission (such as a door lock, an automatic teller machine or a computer system in log-in situations).

The "customer" is the individual requesting the commission from the service provider, and in the following description, the customer and the service provider are also users of the method and the system in accordance with the invention.

By the expression "database" is to be understood the data-storage memory unit as well as the software processing volumes of data and executing operations for instance for the purpose of comparing volumes of data.

By "mobile telephone" is to be understood herein a portable telephone, such as a cellular telephone (e.g. GSM) or the like. The expression naturally includes any portable telephones that may be developed in the future.

SUMMARY OF THE INVENTION

A purpose of an embodiment of the present invention is to solve at least one of the problems outlined above and/or to make it possible to satisfactorily authenticate a customer requesting a service.

A purpose of an embodiment of the invention is to make it possible to authenticate a customer requesting a service, such as by means of a universal method that may be made use of by several service providers without the provider requiring specific equipment, for example.

These purposes and/or other purposes are obtained in accordance with the teachings of embodiments of the invention by means of a method and/or a system.

In accordance with an embodiment of the invention, two identical code word sets are provided for each customer, one set being stored in a memory circuit in a mobile telephone and the other one being stored in a database. Authentication is performed by identification of the mobile-telephone subscription, extraction of a code word from the memory circuit, and the code word is checked against that code word set in the database that is directly or indirectly associated with the mobile-telephone subscription. The relative order of the above operational steps could, of course, be different; for example, the code word could be extracted from the memory circuit prior to identification of the mobile-telephone subscription.

One advantage of the method and system according to an embodiment of the invention compared with prior-art technology is that the code words are of a use-once-only character combined with the fact that no predictable algorithm is used to derive the next code word. To gain knowledge of the code words in a set requires that the memory circuit of the mobile telephone be actually physically stolen or else copied electronically.

In addition, the method and the system according to an embodiment of the invention may be used by an unlimited number of service providers. The only condition required of the service provider is possession of equipment by means of which he is able to establish connection with the database and transfer the code word and the identity, and to receive the results of the authentication. In addition, this means that by blocking his mobile-telephone subscription in the database, the user may easily block all services that make use of the system. One alternative is that the service provider himself owns the database or a subset thereof.

An additional advantage is that the system may be used completely in parallel with and independently of existing security systems. Thus, each service provider may choose on his own whether he wishes to join the system and thereby improve the security of his existing system.

Preferably, the code word is retrieved from the memory circuit in a predetermined order, which improves the security of the authentication further. Not only is a check made to establish whether or not the code word is included in the code word set that is associated with the stated identity, but also a check is made as to whether the code word is the correct one within the set.

In the memory circuit, it is possible to indicate when a code word has been used, and a similar indication may be made in the database. This possibility ensures that the memory circuit and the database agree as to from where in the predetermined sequence that the next code word is to be extracted. Consequently, the memory circuit and the database are prevented from getting "out of phase". This system may be equaled to the situation, wherein the customer carries on him a list of code words that are hidden by a rub-off coating. To use a code word, the customer needs to expose it by rubbing off the coated and the service provider exposes the corresponding hidden code word from his list in the same manner and compares the two. In order for the customer to be accepted, the correct list must be used, and in addition, the correct code word on the list.

One consequence of this procedure is that a dishonest individual, who has secretly gained access to a person's code word set, for example by having copied the memory circuit by electronic means, will only be able to use the memory circuit, if the person has not already made a request and in conjunction therewith used the next code word. Should the dishonest individual actually succeed in accomplishing a request, the fraudulent action will be revealed when next the person is to make a request, since the code word he then indicates will not be accepted. The mobile subscription will then be blocked, and the damage is minimized. This should be compared with the situation according to prior-art technology, when a security device, copied secretly, may be used by a dishonest individual until the owner receives an irregular account statement or similar information.

The step of identifying the mobile-telephone subscription preferably includes the steps of determining the identity of the customer, and based on the identity of the customer, identifying the mobile-telephone subscription. The identity of the customer may consist of suitable data, such as the personal identification number, a credit card number or a mobile-telephone number. The concept "identity" in this case actually only indicates the existence of a direct connection to an individual, and the data representing the identity might be exchangeable. For instance, the identity data from the customer to the service provider could be supplied in the form of e.g. the number of a bank card or a security pass card together with the associated code, or a user ID together with an associated code, and from the service provider to the database in the form of a mobile-telephone number or a predetermined ID number. However, the database must be able to associate the received identity data with a predetermined code word set, normally via the mobile-telephone number, in order thus to be able to check that the given code word has been retrieved from the correct memory circuit.

In accordance with a preferred embodiment, a request is sent to the customer to state a code word. The customer thus can request a service in a conventional manner, whereupon the service provider, as an additional security measure, demands a code word, which the customer retrieves from the mobile telephone. Preferably, the service provider in this case is in possession of information regarding which ones of its customers are connected to the system in accordance with the invention, and as the case may be, sends an inquiry to the database. The database thereafter requests that the customer state a code word.

The request may be forwarded to the mobile telephone via the telecommunication network, and the code word may be transferred from the mobile telephone to the database via the telecommunication network. Preferably, the customer gives his acceptance of transmission of the code word by pressing suitable keys on the mobile-telephone keypad. Because in this manner two separate communication routes are made use of, on the one hand a route between the service provider and the database and on the other between the database and the mobile telephone, security is improved additionally. A dishonest individual, who has caught and distorted information along the first communication route, has no possibility of predicting which mobile-telephone subscription or base station will be used as the next step of the authentication process.

A request forwarded to the mobile telephone, for example in the form of an SMS message or the like, may contain information on the transaction. This may be advantageous, for example in a situation when the card has been swiped through the card reader and has been accepted by the card company, but when the transaction amount has not yet been established. When the entire authentication process has been concluded, a dishonest individual could then state an erroneous amount, thus charging the account of the customer with too high an amount. By means of an SMS message as indicated above the fraud would be detected by the customer, who thus is informed of the fraudulent request to his mobile telephone and then is able to deny acceptance of the transaction.

The fact that the mobile telephone is contacted directly gives the user a possibility of detecting a fraudulent action as it is being perpetrated. He can then block the mobile-telephone subscription immediately, or block the card or the service exposed to the fraud. Let us assume that someone has stolen or copied a person's credit card and in addition has succeeded in obtaining the next code in that person's memory circuit. When the card is being used and a transaction is accepted by the database, a message is sent to the person's mobile telephone, whereupon the person is apprised of the fact that someone has used one of the code words in the memory circuit. Another possibility is to delay the request for a code word to the customer for a predetermined length of time, or to make use of two confirmations, spaced apart in time. This procedure would prevent a dishonest individual from using a mobile telephone, which is later returned to the owner, without the owner being aware thereof. The length of the delay may be adapted to ensure that the owner of the mobile telephone will have time to miss it and block it before a code-word request is sent to the mobile telephone and the order thus confirmed.

At the same time, this method permits a customer to allow a third person to use the customer's card for a particular service, for example to buy some merchandise. Irrespective of his whereabouts, the customer is informed of the purchase on his mobile telephone, and makes the final confirmation via his mobile telephone.

Particularly in the case of service requests via the Internet, it is advantageous that a request from the database or the provider of the service is made directly to the mobile telephone, since all Internet-transferred information is accessible to others to a larger or smaller extent. An SMS message made to the customer's telephone therefore is an excellent acknowledgement of the correctness of the transaction.

In accordance with another embodiment of the invention the identity of the customer and the code word retrieved from the memory circuit are transferred to the service provider, the mobile-telephone subscription associated with the customer is identified by the service provider, and the identities of the code word and the mobile-telephone subscription are transferred to the database by the service provider. This method allows the customer to transfer, directly in conjunction with the request, his identity as well as a code word to the service provider. The identification of the mobile-telephone subscription is then effected either by the service provider or by the database.

In accordance with a further embodiment of the invention a second code word is retrieved from the memory circuit and transferred to the database in order to additionally verify the authenticity of the request. The code words of the set may be associated with one another in groups comprising different numbers of code words, to be used for different types of service requests of different security levels.

The first code word may be transferred from the customer to the database, perhaps via the service provider, whereupon the database issues a request to the customer to state a second code word, and finally, the second code word is transferred from the customer to the database. The request to the customer may be effected in the same way as in the case of the request described above. One possibility thus is that the customer receives two successive requests to the mobile telephone to transfer a code word. Another possibility is that the customer first states a code word directly in conjunction with making his request and thereafter is asked to state an additional code word. Obviously, several other possibilities exist, and in particular the PIN code of the mobile telephone may be made use of as one means of increasing authentication security.

According to one embodiment of the invention, also position data associated with the mobile-telephone subscription are stored in the database. In the authentication process, the memory circuit is located, and the position data received may be compared with the position data stored in the database. This method may be used to geographically restrict the area within which the customer can effect certain types of service requests. For example, purchases above a certain amount may be limited to a few, predetermined locations, which increases security further. This geographic check can also be applied for logging-in into a computer system, which perhaps is allowed only from the work premises or from home. Alternatively, position data in the database could be an IP address, allowing log-in processes or Internet transactions to be restricted to a specific computer unit, without such information being available to the service provider or anywhere on the Internet.

BRIEF DESCRIPTION OF THE DRAWINGS

The present invention will be described in more detail in the following with reference to the accompanying drawings, which for exemplifying purposes show preferred embodiments of the invention. In the drawings.

DESCRIPTION OF PREFERRED EMBODIMENTS

Figure 1A:
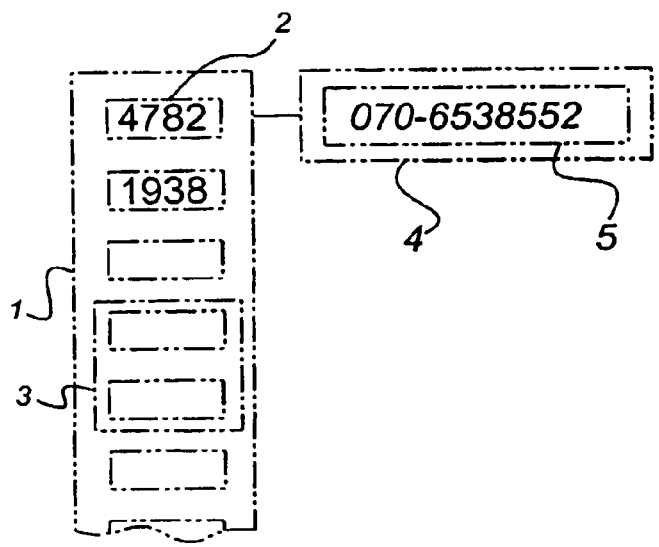
FIGS. 1a-b show two code word sets in accordance with the invention.
Figure 1B:
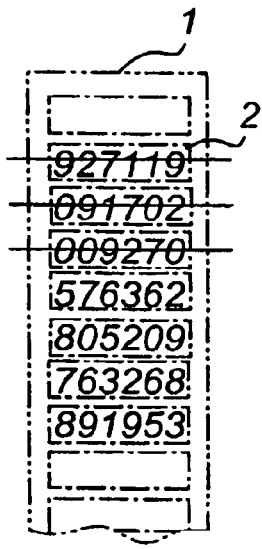

FIGS. 1a–b show two examples of a code word set 1 consisting of a plurality of codes 2 in the form of four-digit or six-digit number combinations. These number combinations are extracted at random and have no deducible relationship, neither as to their composition nor as to their sequence. The codes may be arranged in groups 3 containing two or several codes 2 in each group.

Since each code in itself is entirely independent of the others, there is nothing to prevent one combination of numbers to appear several times in the same set, or even within the same group.

The code-word set 1 is associated with an identity 4, which is directly or indirectly connected with a mobile-telephone subscription. In the shown example, the identity consists of a mobile-telephone number 5.

Figure 2:
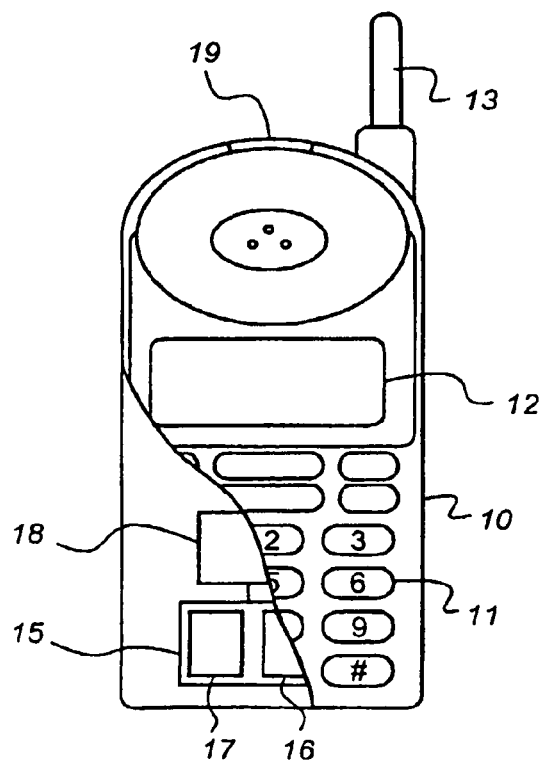
FIG. 2 shows a mobile telephone in accordance with the invention.

The mobile telephone 10, shown schematically in FIG. 2, is equipped in the conventional manner with a keypad 11, a display 12, and a receiver/transmitter 13. The mobile telephone also has a memory circuit 15, for example a SIM card or similar smart card, which contains data 16 pertaining to the mobile-telephone subscription. For example, a SIM card may comprise information on the telephone number of the subscription and on how much credit remains in the customer's account with the mobile service provider. In accordance with the invention, the memory circuit 15 is also provided with a code word set 17 that is associated with the subscription.

The SIM card may be provided with a subscription ID and a code word set before being delivered to a retailer under conditions of extreme security, for example in the form of a seal of some kind. The customer, who buys or in some other way gets hold of the SIM card checks that the seal has not been violated and thereafter arranges the SIM card in his mobile telephone, which allows him to use the telephone.

In addition, the mobile telephone shown in FIG. 2 comprises means, such as software 18, devised to retrieve from the memory circuit 15 a code word from the code word set 17, and to transmit the code word by means of mobile-telephone communication, for example in a SIM message. Software having this function may be developed by the expert in the field. The software 18 may also transmit a code word via a communication port or an IR port. In addition, a retrieved code word may be shown on the display 12.

Furthermore, the software 18 is arranged to receive a code word and to compare the code word with the code word set in the memory circuit. The code word may be inputted by means of the keypad 11, or else be received by means of mobile-telephone communication directly to the receiver 13 of the mobile telephone, for example through reception by the mobile telephone of a SMS message.

Preferably, the mobile telephone is arranged to be set in a dormant state, wherein it does not receive any telephone calls but wherein it is capable of receiving and transmitting SMS messages. This function may be devised by an expert in the field.

Figure 3:
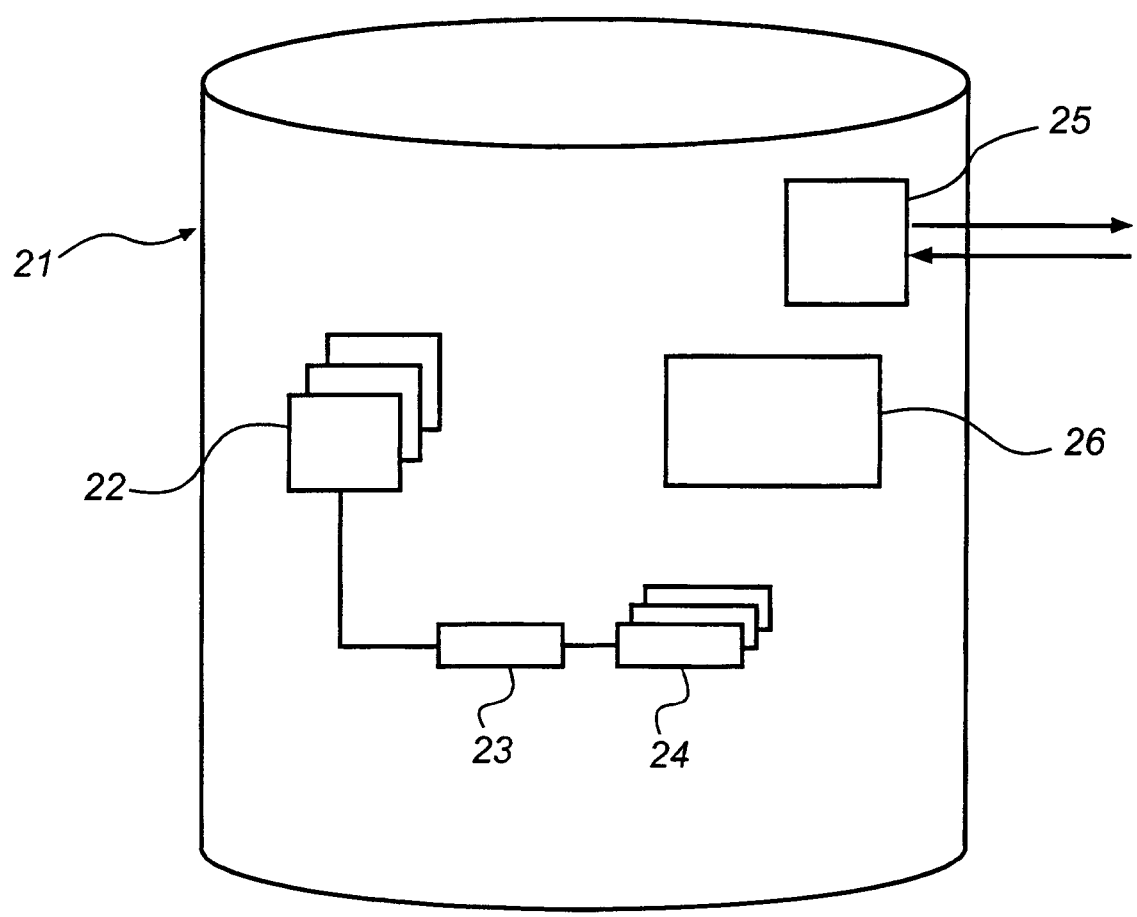
FIG. 3 shows a database in accordance with the invention.

In the database 21 shown in FIG. 3, a plurality of code-word sets 22 are stored, each one having an identity 23 that is associated with a mobile-telephone subscription, the corresponding SIM card of which comprises an identical code word set.

In addition, each set 22 can be associated to one or several position indications 24. The position indications could for instance be locations where the customer has indicated that he wishes to be able to make a certain type of requests.

The database 21 is furthermore provided with communication means 25 able to receive a question and to provide the results of the authentication process. For example, the communication means 25 could be a modem arranged to communicate with the service provider, for example to receive a code word and an identity from the service provider, and to transmit confirmation to the service provider that the authenticity of the commission is verified. The communication means 25 could also be arranged to communicate with the mobile telephone via the mobile-telephone network, for example by way of SMS messages.

The database 21 is also provided with means, preferable software 26, arranged to perform searches in the database and to verify e.g. that a specific code word exists in the code word set 22 in the database associated with a predetermined identity 23.

Figure 4:
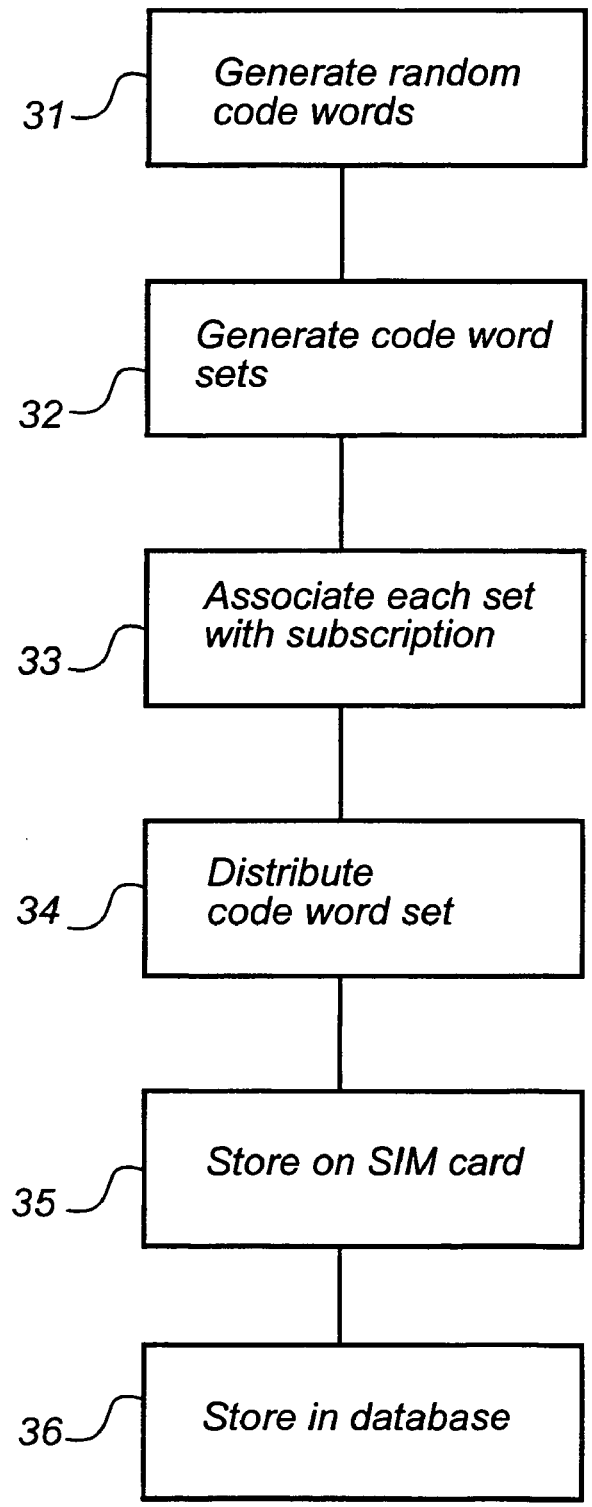
FIG. 4 shows the manner of retrieval and storage of the code-word sets of FIG. 1, FIGS. 5a-e show five different preferred embodiments of the method according to the invention.

FIG. 4 illustrates how code-word sets 1 are formed and stored.

In a completely independent computer system, combinations of numbers are created at random in accordance with algorithms that cannot be predicted from the outside (Step 31). This procedure ensures that nobody can predict which code words are included in a particular code word set, and can easily be devised by an expert in the field. The combinations of numbers are arranged in groups and sets (Step 32), in accordance with algorithms, which in themselves may be allowed to be known outside the computer system. In addition, the computer system is provided with a series of mobile-telephone numbers which are supplied by a mobile-telephone service provider, and which associate each code word set with a particular telephone number (Step 33).

The sets are then distributed (Step 34) to companies that equip the SIM cards with data, where each code word set is stored on a SIM card (Step 35), the latter either prior to or after the storage having been attributed to the mobile-telephone number associated with the mobile-telephone number.

In addition, the sets are also distributed (Step 34) to the database, where they are also stored (Step 35). The sets may be stored on access-protected data carriers, such as coded and sealed CDs, which are distributed in a safe manner, for example by means of couriers. If the computer system forming the sets is connected to the database, this part of the distribution may be effected safely electronically.

FIGS. 5a–e illustrate generally five different varieties of the manner in accordance with the invention of implementing the process of authenticating a request from a customer 41 to a service provider 42. In all cases, the customer 41 has access to a mobile telephone 10 in accordance with FIG. 2.

Figure 5A:
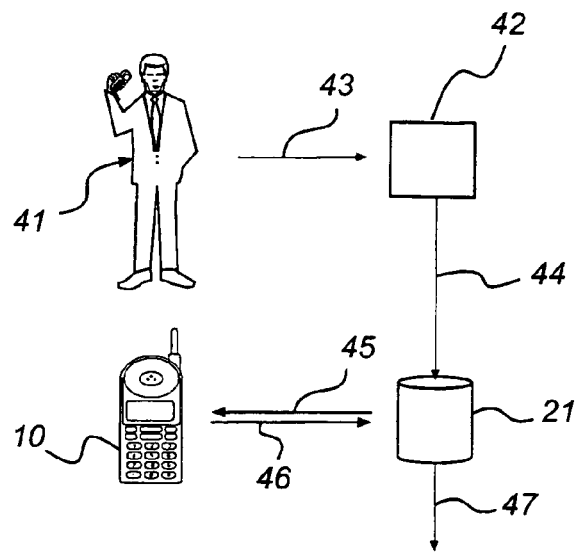

In accordance with the method of FIG. 5a, the customer initially states his identity 43 to the service provider 42. Normally, he does this in conjunction with making his request, in which case he provides e.g. a user's ID, a credit card number, or other information allowing the service provider to identify the customer.

The service provider possesses information on which customers are connected to the system in accordance with the invention, and is able to associate a mobile-telephone subscription with the identity of the customer. The service provider 42 sends a query to the database 21, and transmits to the database 21 the identity of 23 of the mobile-telephone subscription, usually in the form of a mobile-telephone number but possibly in the form of another identification associated with the mobile-telephone subscription. It should be understood that instead the identity 43 of the customer could be transmitted to the database 21 and the mobile-telephone subscription in question be identified by the database.

The database thereafter sends a request 45 to the mobile telephone 10 via the telecommunication network, for example an SMS message, or the like. The message 45 contains particulars of the request, which are shown on the display 12, thus allowing the customer to check the correctness of the request. In the affirmative, the customer may confirm the fact in any suitable manner, for example by pressing a particular key on the keypad 11 twice. For example, the customer may receive a message on his mobile telephone of the type reading "Credit card purchase $35 at Burger King. Press OK to confirm", or "You are now logging-in into your workplace, Press OK to confirm". The customer then presses the OK key. An additional confirmation step of the type "Are you sure Y/N" might be advisable as an extra check. The software 18 of the mobile telephone then retrieves from the SIM card 15 the next, not yet used code 46 and transmits the latter from the mobile telephone 10 to the database 21. Simultaneously, the transmitted code word is marked as used on the SIM card. The request 45 from the database could also contain a code word (not shown), which is checked by the mobile-telephone software 18 against the code word set 17 in the SIM card 15.

Another possibility is that the database 21 contacts the service provider 42, who in turn asks the customer for a code word, which the provider returns to the database 21.

As the database 21 receives the code word 46, the latter may be compared with the code word set 22 that is associated with the mobile-telephone subscription. Should the check fail, for example because the code cannot be found in the code word set in the database that is associated with the mobile-telephone number, information of this fact is transmitted to the service provider, who may refuse to perform the service, for example by refusing access to a computer system or stopping a transaction. On the other hand, if the check is positive, i.e. the stated code is the correct one, a go-ahead signal 47 is transmitted to the service provider 42, who may then perform the service. At the same time, the code word received is marked as being used up.

Figure 5B:
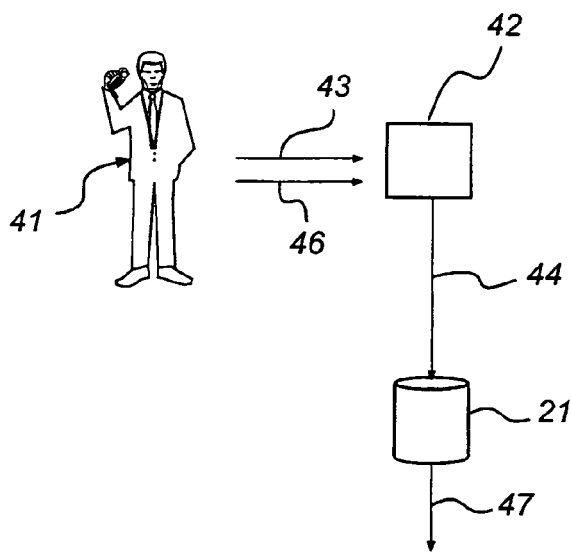

In accordance with the method shown in FIG. 5b, the customer 41 states a code word 4 in conjunction with giving his identity 43 as described above. For example, the customer 41 may read a code word 46 from the display 12 of the mobile telephone 10 and transmit that word to the service provider 42. Alternatively, a data transmission port 19 in the mobile telephone may be used to transmit a code word to the service provider.

The service provider then issues a query 44 to the database 21 and in addition to transmitting the identity as described above, he also transmits the code word 46. The database 21 checks the code word as described above and sends a go-ahead signal 47 to the service provider 42.

Figure 5C:
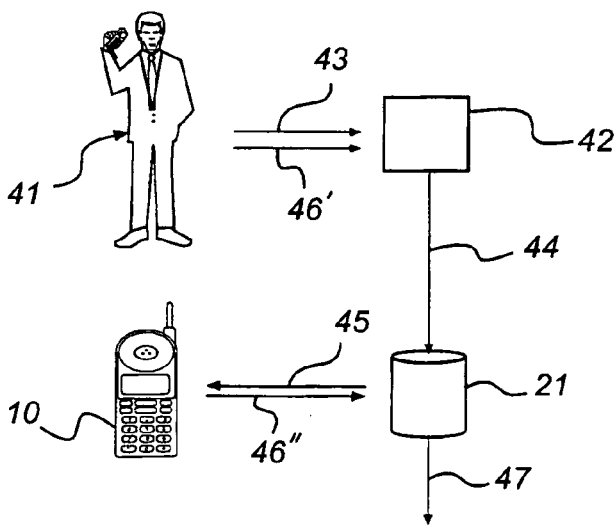

The method shown in FIG. 5c actually is a combination of the two previous methods. The customer 41 first states a code word 46' as he makes his request in accordance with FIG. 5c and then receives a request 45 for an additional code word 46" in accordance with FIG. 5a.

In order to further increase security, the software 18 may be arranged, in the case of certain requests, such as purchases above a predetermined amount, to demand the user's PIN code as a condition for retrieval and transmission of the code word. This arrangement means that a dishonest individual who has got hold of a mobile telephone that is in the switched-on state still has to know the owner's PIN code.

In addition, the position data stored in the database could be used to increase security. The base station over which the mobile telephone communicates can be identified comparatively easily, and a comparison with the stored position data may be performed. Likewise, it may be possible to equip the mobile telephone with a GPS navigator or similar means, allowing the mobile telephone to make his position known with great accuracy. The position check could in this case be effected in two steps, the first one roughly with respect to the base station and the second one more precisely, with respect to longitude and latitude.

Figure 5D:
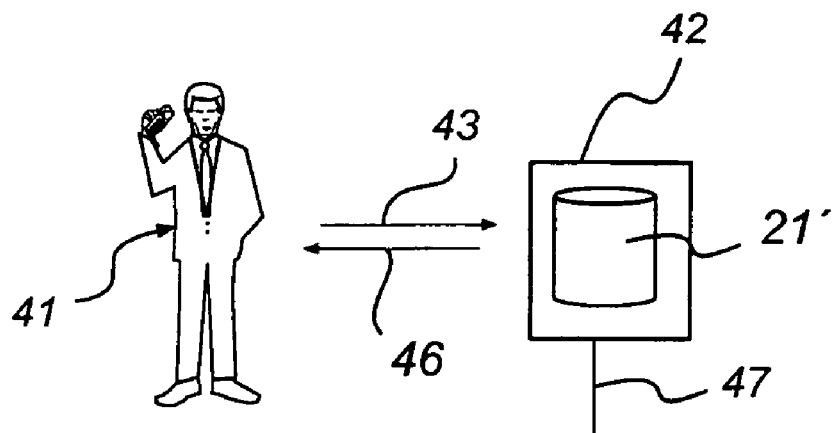

The method shown in FIG. 5d could be regarded as a variety of the method shown in FIG. 5b. In this case, the database 21' is owned by the service provider 42, for which reason no external communication is required from the service provider 42. The database 21' could be a subset of a larger database 21. This method could be used for instance when a person is to be given access to a protected object, such as a car. The car is equipped with a database 21' comprising a number of code words, and the user may be simply identified by means of his mobile telephone.

Figure 5E:
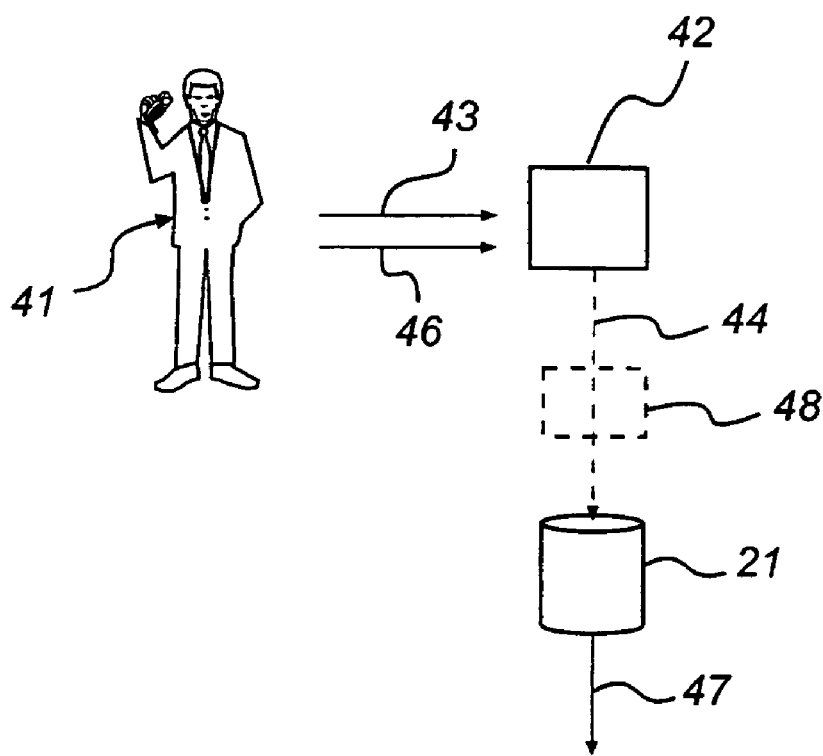

The method shown in FIG. 5e is very similar to the method of FIG. 5b, but the check vis-à-vis the database 21 is effected only after some delay 48. If the mobile telephone subscription does not satisfactorily manage the credit check and ID check, the mobile telephone is blocked in the service-provider system. Examples of use of this method are payment of public-transport fees and parking fees.

Further varieties and combinations of these methods are possible within the scope of the invention. The number of code words exchanged between the mobile telephone and the database may vary, depending on the desired security level.

In the following, some examples will be given of situations, wherein an authentication method in accordance with the invention is particularly suitable.

Restaurants

A guest who has dined in a restaurant requests from his credit card company or the like the service of paying the restaurant bill, using funds available in the guest's own account or in the account of the account card company (credit card). The card company thus is the service provider and the guest the customer.

In the conventional manner, the credit card is handled by the restaurant personnel, who check the card for verification of its number, its validity, whether funds are available in the account, that the card is not blocked, etc. In this manner, the card company receives information on the identity of the customer, for example through the unique card number. In accordance with a commonly used technology, the card is swiped in a card reader, which via a modem contacts the card company and checks the transaction.

In a register, the card company has stored data showing that the customer is connected to the system in accordance with the invention, and identifies the telephone number of the mobile-telephone subscription. It is transmitted to the database, which thereafter contacts the mobile telephone via the telecommunication network and receives a code word (FIG. 5a).

Alternatively, the customer uses his mobile telephone in order to state a code word as he makes his request (FIG. 5b). The code word may be disclosed to the restaurant personnel, who contacts the card company via the card terminal and transmits the code, or else it may be transmitted from the mobile telephone to the card terminal by means of some kind of communication means, such as an IR port.

When the authenticity of the code word has been verified by the card company, a go-ahead signal 47 is sent to the restaurant, and a receipt is printed.

Internet Transactions

The method is similar when a computer user wishes to make a transaction on the Internet or the like, for example transfer funds from one of his bank accounts, or make purchases using a credit card. In this case, the computer user is the customer requesting a service in the form of a transaction. The service provider could be a card company as above, or the customer's own bank.

In this case, the identity of the customer is transmitted by input of for example a personal identification number and the associated password, or a credit card number or the like. Inputting may be effected in a screen display on a WWW page, and the contents of the page be sent to the owner of the page through pressing a key.

If a method in accordance with FIG. 5a is used, the process is identical with that of the example described above, and within minutes the customer receives an SMS message on his mobile telephone and is able to confirm the request by pressing suitable keys. If a method in accordance with FIG. 5b is used, according to which the customer reads a code word from the display of the mobile telephone, the code word may be transmitted in the same manner as the identity, either on the same WWW page or on a following page appearing immediately after acceptance of the identity.

Log-in/Passing-in

Another category of services that is suitable for authentication checks in accordance with the invention is requests for log-in into a computer system. In this case, the customer is the person requesting to access the system, the service is admittance of the person into the computer system or the like, and the service provider is the company or computer system responsible for security.

The customer states his identity when logging in according to prior-art technology, and in conjunction therewith he enters for example a user ID including a password. The service provider can then contact the database, which demands a code word directly from the mobile telephone in accordance with FIG. 5a. Alternatively, the customer may be given a possibility in accordance with FIG. 5b to indicate, via the keypad, a code that has been read on the mobile-telephone display.

The procedure of allowing physical passing into premises or an area is similar to that of log-ins. For example, the identity of the customer could in this case be provided by swiping a security-pass card through a card reader or inputting a code on a door lock.

Example of a Detailed Chain of Events for Credit card Payments

Figure 6:
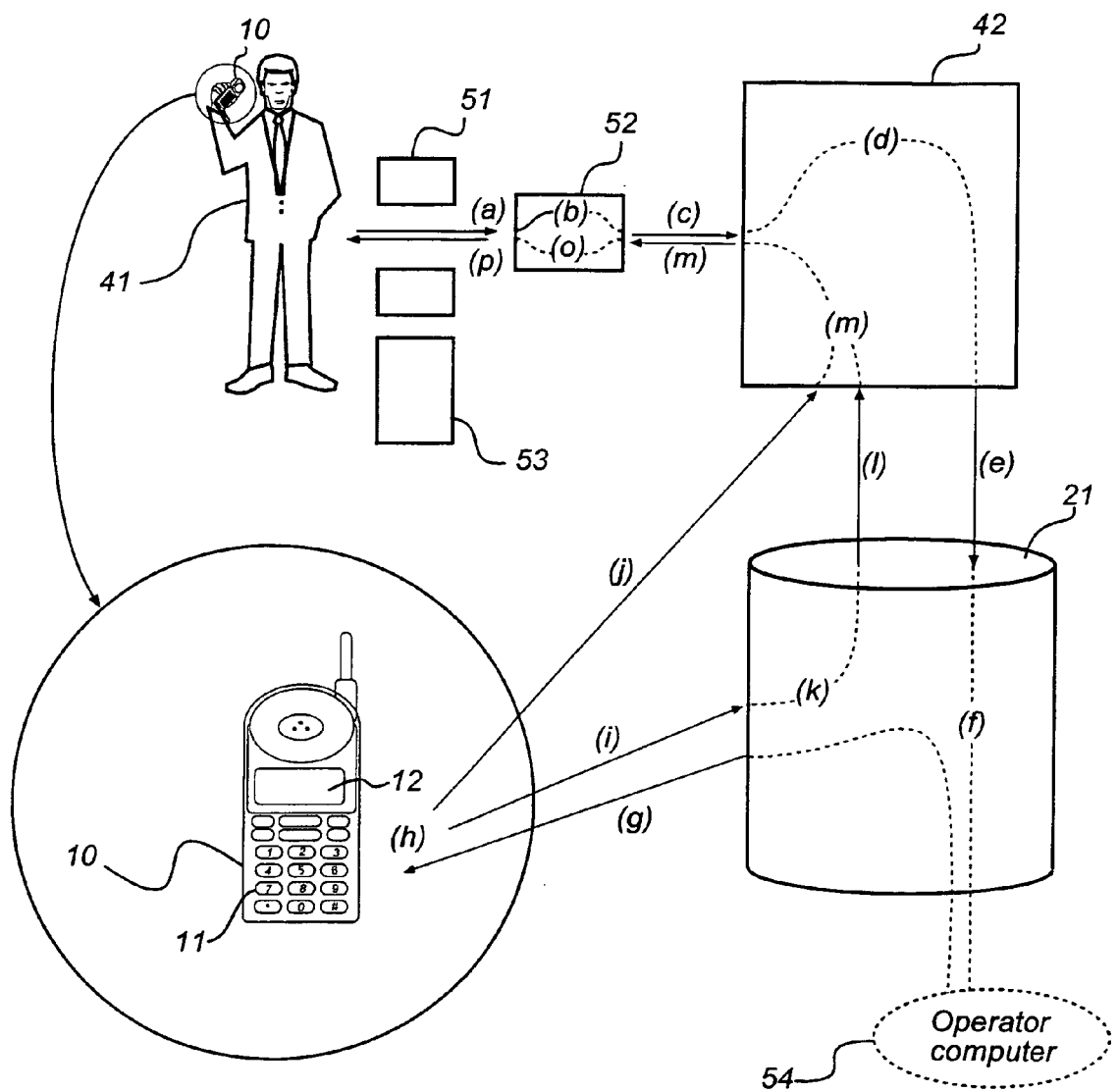
FIG. 6 illustrates the method in accordance with the invention in a more detailed view.

With reference to FIG. 6, a more detailed description will be given below of a possible chain of events necessary to allow a legitimate customer to implement a request with a high degree of security. If the security of the request is not classified to be of the same high degree, certain operational steps could be excluded from the chain of events. Preferably, it is the computer of the service provider that determines the security classification of the request and whether or not a tip should be given at the point of sale. In this manner, the rest of the chain of events is controlled based on the security classification and on whether or not a tip should be given.

The customer 41 hands over a credit card 51.

b) The credit card is swiped through the card reader terminal 52 and the amount to be paid (inclusive of wardrobe fees and the like, if any) is inputted into the terminal. The terminal 52 generates a message of the desired payment, comprising e.g. the credit card number, the number of the card terminal and the amount to be paid.

c) The card terminal sends the message generated in (b) to the computer of the credit card company (service provider 42).

d) The computer of the credit card company checks the transaction for sufficient credit, and if the check is positive, the computer generates a message concerning the transaction (seller and amount, and so on), stating the number of the request, the security classification of the request, whether a "tip" should be given, and the mobile-telephone number of the credit card holder.

e) The computer of the credit card company transmits the message received in (d) to the database 21.

f) The database 21 retrieves the next not-used code word, checks with the mobile operator 54 concerned whether the mobile telephone is on an accepted location, and generates a message, demanding confirmation of the request. The message comprises e.g. data as to the seller, the number of the request, security classification, whether tips are expected, and the next non-used code word (576362).

g) The database 21 transmits the message that was generated in (f) to the customer's mobile telephone 10.

h) The mobile telephone checks the security classification concerned and whether a tip-payment situation exists. Based on the results of the check, the mobile telephone selects the routine to be followed. The mobile telephone presents the query on the display and asks for confirmation. The customer presses the OK key for confirmation. In cases of high-security classification, the mobile telephone requires that the customer inputs his PIN code or a corresponding pass word that only the customer knows. If a point of sale is involved (such as a restaurant) where tips are customary, a question will appear on the display of the customer's mobile telephone as to whether the amount should be increased, and the customer may then input a new, higher amount. The mobile telephone asks the customer to again confirm and if the customer does so, either one or two messages are generated, depending on the security classification. Both messages state e.g. the number of the mobile telephone, the number of the request, the seller, the amount, the final amount (in the case of a tip), the first non-used code word (576362) and the following non-used code word (805209) and, if the mobile telephone has an integrated GPS receiver, also the GPS co-ordinates are given. The mobile telephone registers the two code words as used up. The entire step (h) is processed by the software 18 of the mobile telephone 10, and this software may be developed by an expert in the field.

The mobile telephone 10 transmits the message generated in (h) to the database 21.

j) The mobile telephone 10 transmits the message generated in (h) to the computer 42 of the credit card company.

k) The database 21 checks the message received from the mobile telephone and if both code words are correct, an ID confirmation message is generated, which includes both code words, and the two code words are registered as being used up.

l) The data base 21 sends the ID confirmation message generated in (k) to the computer 42 of the credit card company.

m) The computer of the credit card company checks the message from the mobile telephone (j) and the ID confirmation message from the database (l) and executes suitable comparisons. If all data are accepted, a printing order is generated, which comprises suitable information, such as seller, buyer, amount, credit card number, number of request, date, time and verification number.

n) The printing order is transmitted to the card terminal 52.

o) The card terminal prints the transaction receipt 53.

p) The credit card 51 is returned to the customer, who signs the transaction receipt 53, keeping the copy while the seller keeps the original.

The following steps represent the customer's experience of the chain of events described above.

The customer hands over his credit card in the usual way.

On the display of his mobile telephone, the customer receives information on the payment, and he and confirms the commission by pressing two keys. When the commission is considerable (high security classification), the customer has to input his PIN code or other similar password between the first and the second confirmation, and if needed he adjusts the amount, i.e. he gives a tip.

The customer signs the transaction receipt and keeps the copy, in the customary manner.

Additional steps: By pressing keys twice, the customer confirms the payment and also inputs, if required, the PIN code and increases the amount if a tip is to be given.

Steps that disappear: The customer need not show any identification papers.

The following sequence of steps represents the seller's experience of the above chain of events.

The seller accepts the credit card and runs it through the reader of the card terminal, as usual.

The seller inputs the amount via the card terminal as usual.

The seller tears off the transaction receipt as usual.

The seller makes sure that the customer signs the receipt of the transaction and keeps the original as usual.

Additional steps: None

Steps that disappear: The seller does not have to ask for identification papers, check the latter or register the number of the identification papers.

Possible Varieties of Locations Where Rapid Payment is Essential

In case of payment of smaller amounts in shops, kiosks, petrol stations, and the like, the confirmation might not necessarily have to be effected over the mobile network, since this procedure might take about a minute longer. Instead, the IR data transmission port 19 of the mobile telephone might be used. In this case, the card terminal is also equipped with a corresponding communication port (not shown) and software, as well as with a display, should the cash register not already have a display facing the customer. The communication port preferably is located on the display unit or close to the latter.

According to this embodiment, the seller swipes the customer's credit card through the reader, and inputs the amount, or receives it directly, for instance from the petrol pump that the customer has just used, i.e. in the manner in operation today. When this is done, the amount is shown on the display mentioned above, said display also requesting the customer to e.g. "Confirm payment by means of your mobile telephone". The customer then directs his mobile telephone towards the display and receives e.g. the name of the petrol station and the amount in question. By two confirmation key pressings on the mobile-telephone keypad, the first non-used code word is transferred to the card terminal and the display may show e.g. "Password received". From then on, everything functions as it does today.

It could be said that the mobile telephone replaces the control keypad commonly existing in many petrol stations, at least in Sweden. However, any person standing close by could make note of the code that is being inputted, even if a screen is provided to make this more difficult. Should the person who just inputted his check code leave his card on the desk, this might constitute a temptation to a dishonest individual. Such a person could, for instance block the credit card from view by putting his hand over it and let it slide down into his pocket. The dishonest individual could then fill the family cars with petrol before the rightful owner notices that his credit card is missing, for instance when a week later he again intends to fill his car with petrol.

A consequence of the invention is that a code word is never used more than once, and in addition that normally nobody, neither the customer nor any one else, will ever set eyes on any code words whatsoever.

CONCLUSION

It should be understood that a number of varieties of the embodiments described above are possible within the scope of protection of the appended claims. For example, a large number of alternative authentication methods can be used with a system in accordance with the invention. In the same manner, equipment different from the one described herein could be used to implement the method in accordance with the invention.

What is claimed is:

1. A method of authenticating a commission from a customer to a service provider, comprising the steps of
   forming a plurality of sets of randomly generated code words;
   storing one of said plurality of code word sets in a memory circuit of a mobile telephone, which circuit is associated with a mobile-telephone subscription;
   storing an identical code word set in a database together with an association to said mobile-telephone subscription; and
   at the time of requesting the commission, identifying said mobile-telephone subscription, retrieving at least one code word from the memory circuit and checking the presence of said code word in the code word set in the database that is associated with said mobile-telephone subscription, thereby authenticating the commission.

2. A method as claimed in claim 1, wherein the code word is retrieved from the memory circuit in a predetermined sequence known to the database.

3. A method as claimed in claim 2, further comprising the step of registering, in at least in one of the memory circuit and the database, when a code word has been used, thus ensuring said predetermined sequence is followed.

4. A method as claimed in claim 1, wherein the step of identifying the mobile-telephone subscription comprises the steps of
   determining the identity of the customer, and,
   based on the identity of the customer, identifying the mobile-telephone subscription.

5. A method as claimed in claim 1, wherein a request to provide a code word is sent to the customer.

6. A method as claimed in claim 5, wherein the request is sent to the mobile telephone via the telecommunication network.

7. A method as claimed in claim 5, wherein the code word is transmitted from the mobile telephone to the database via the telecommunication network.

8. A method as claimed in claims 1, wherein
the identity of the customer and the code word retrieved from the memory circuit are transferred to the service provider,
the mobile-telephone subscription associated with the customer is identified by the service provider, and
the code word and the identity of the mobile-telephone subscription are transferred to the database by the service provider.

9. A method as claimed in claim 1, wherein a second code word is retrieved from the memory circuit and is transferred to the database to further authenticate the commission.

10. A method as claimed in claim 9, wherein the code words in the set are connected to one another in groups, said first and said second code words being included in the same group of code words.

11. A method as claimed in claims 9, wherein said first code word is transferred from the customer to the database, the database sends a request to the customer to provide said second code word, and said second code word is transferred from the customer to the database.

12. A method as claimed in claim 1, further comprising the steps of
associating at least one position indication with the mobile-telephone subscription and storing said indication in the database, and,
each time a commission is requested, establishing the location of the memory circuit and checking the position indication thus obtained against said position indication stored in the database.

13. A method of authenticating a commission from a customer to a service provider, wherein a set of randomly generated code words has been stored in a memory circuit associated with a mobile-telephone subscription in a mobile telephone as well as in a database together with an association to said mobile-telephone subscription, comprising the steps of:
establishing the identity of the customer;
identifying the mobile-telephone subscription on the basis of the identity of the customer;
retrieving a code word from the memory circuit; and
checking the presence of said code word in the code word set in the database that is associated with said mobile-telephone subscription, in order to thus authenticate the commission.

14. A system for authenticating a commission from a customer to a service provider, comprising:
a mobile telephone having a memory circuit associated with a mobile-telephone subscription;
means to enable the customer to disclose his identity to the service provider;
a database;
a set of randomly generated code words, said set stored in the first place in the memory circuit and in the second place in the database, where it is associated with the mobile-telephone subscription;
means to identify the mobile-telephone subscription based on the identity of the customer;
means to enable the customer to retrieve a code word from the memory circuit and to transfer said code word to the database; and
checking means for checking that said code word is present in the code word set in the database that is associated with said mobile-telephone subscription, in order to thus authenticate the commission.

15. A system as claimed in claim 14, wherein said checking means comprises a communication means for communication between the database and the mobile telephone.

16. A method as claimed in claims 2, wherein
the identity of the customer and the code word retrieved from the memory circuit are transferred to the service provider,
the mobile-telephone subscription associated with the customer is identified by the service provider, and
the code word and the identity of the mobile-telephone subscription are transferred to the database by the service provider.

17. A method as claimed in claims 3, wherein
the identity of the customer and the code word retrieved from the memory circuit are transferred to the service provider,
the mobile-telephone subscription associated with the customer is identified by the service provider, and
the code word and the identity of the mobile-telephone subscription are transferred to the database by the service provider.

18. A method as claimed in claim 6, wherein the code word is transmitted from the mobile telephone to the database via the telecommunication network.

19. A method as claimed in claims 10, wherein said first code word is transferred from the customer to the database, the database sends a request to the customer to provide said second code word, and said second code word is transferred from the customer to the database.

20. A method as claimed in claim 2, wherein a request to provide a code word is sent to the customer.

* * * * *